United States Patent [19]

Vassiliades

[11] Patent Number: 4,586,060

[45] Date of Patent: Apr. 29, 1986

[54] MICROENCAPSULATION PROCESS MULTI-WALLED MICROCAPSULES, TRANSFER SHEET RECORD MATERIAL AND ITS PRODUCTION

[76] Inventor: Anthony E. Vassiliades, 8738 Tanager Woods Dr., Cincinnati, Ohio 45242

[21] Appl. No.: 513,698

[22] Filed: Jul. 14, 1983
(Under 37 CFR 1.47)

Related U.S. Application Data

[63] Continuation of Ser. No. 173,303, Jul. 29, 1980, abandoned.

[51] Int. Cl.$^4$ .................... B01J 13/02; B41M 3/12; B41M 5/16
[52] U.S. Cl. ..................... 346/215; 156/330; 264/4.3; 424/32; 427/150; 428/402.21; 514/962
[58] Field of Search ............ 264/4.3; 428/402.21; 427/150; 346/215

[56] References Cited

U.S. PATENT DOCUMENTS

| | | | |
|---|---|---|---|
| 3,179,600 | 4/1965 | Brockett | 346/200 |
| 3,418,250 | 12/1968 | Vassiliades | 346/215 |
| 3,418,656 | 12/1968 | Vassiliades | 346/215 |
| 3,488,207 | 1/1970 | Vassiliades | 346/217 |
| 3,575,882 | 4/1971 | Vandegaer et al. | 264/4.7 |
| 3,576,660 | 4/1971 | Bayless et al. | 346/215 |
| 3,577,515 | 5/1971 | Vandegaer | 424/32 |
| 3,578,605 | 5/1971 | Baxter | 264/4.3 |
| 3,585,149 | 6/1971 | Vassiliades et al. | 428/402.2 |
| 3,669,899 | 6/1972 | Vassiliades et al. | 428/402.24 |
| 3,707,514 | 12/1972 | Vassiliades et al. | 521/65 |
| 3,720,579 | 3/1973 | Vassiliades et al. | 162/162 |
| 3,726,803 | 4/1973 | Bayless et al. | 427/213.33 |
| 3,752,698 | 8/1973 | Vassiliades et al. | 428/313.3 |
| 3,779,941 | 12/1973 | Powell | 428/402.21 |
| 3,779,957 | 12/1973 | Vassiliades et al. | 521/54 |
| 3,781,230 | 12/1973 | Vassiliades et al. | 428/313.3 |
| 3,816,169 | 6/1974 | Vassiliades et al. | 428/313.5 |
| 3,824,114 | 7/1974 | Vassiliades et al. | 428/198 |
| 3,844,816 | 10/1974 | Vassiliades et al. | 346/207 |
| 3,875,074 | 4/1975 | Vassiliades et al. | 428/402.22 |
| 3,886,084 | 5/1975 | Vassiliades | 428/402.22 |
| 3,914,511 | 10/1975 | Vassiliades | 346/206 |
| 3,919,110 | 11/1975 | Vassiliades et al. | 428/402.22 |
| 3,956,172 | 5/1976 | Saeki et al. | 264/4.3 |
| 3,993,831 | 11/1976 | Vassiliades | 428/321.5 |
| 4,000,345 | 12/1976 | Powell | 428/321.5 |
| 4,021,595 | 5/1977 | Kiritani et al. | 346/213 |
| 4,062,799 | 12/1977 | Matsukawa et al. | 264/4.3 |
| 4,075,389 | 2/1978 | Vassiliades et al. | 428/313.3 |
| 4,082,688 | 4/1978 | Egawa et al. | 264/4.3 |
| 4,091,162 | 5/1978 | Henderson et al. | 428/327 |
| 4,115,474 | 9/1978 | Vassiliades et al. | 525/58 |
| 4,138,362 | 2/1979 | Vassiliades et al. | 428/402.2 |
| 4,154,562 | 5/1979 | Golden et al. | 425/89 |
| 4,173,488 | 11/1979 | Vassiliades et al. | 106/213 |
| 4,182,788 | 1/1980 | Vassiliades et al. | 428/40 |
| 4,200,667 | 4/1980 | Lee et al. | 427/44 |
| 4,209,188 | 6/1980 | Chao et al. | 346/215 |
| 4,273,672 | 6/1981 | Vassiliades | 264/4.1 |

*Primary Examiner*—Richard D. Lovering
*Attorney, Agent, or Firm*—Sigalos & Levine

[57] ABSTRACT

A process for the formation of microcapsules having at least two polymeric substances forming the final microcapsule walls comprising forming a stable emulsion droplet comprising an amphiphilic polymeric agent and the material to be encapsulated and coupling to said amphiphilic polymeric agent at least one polymeric substance to form a substantially impermeable wall about said material, said at least one polymeric substance being capable alone of reacting with said amphiphilic polymeric agent or capable of coupling with said amphiphilic polymeric agent in the presence of a coupling agent capable of reacting with said amphiphilic polymeric agent and said at least one polymeric substance. Also the resultant microcapsules and products, preferably, transfer sheet materials utilizing said microcapsules.

34 Claims, No Drawings

MICROENCAPSULATION PROCESS MULTI-WALLED MICROCAPSULES, TRANSFER SHEET RECORD MATERIAL AND ITS PRODUCTION

This is a continuation of Application Ser. No. 73,303 filed July 29, 1980 and now abandoned.

BACKGROUND OF THE INVENTION

This invention relates to a novel method of producing microcapsules. More specifically, it relates to the preparation of microcapsules having walls of low permeability and high mechanical and thermal stability.

Microcapsules containing solid, liquid gaseous materials have been used commercially in various applications for several years. One of the most common uses of such microcapsules has been in pressure sensitive copy systems wherein a chromogenic material dissolved in an oily solvent is encapsulated and coated onto a transfer substrate. With the application of localized pressure such as from a stylus, typewriter, pen, or other implement, the microcapsules rupture and the chromogen solution is transferred to an underlying sheet having an absorbent coating of a Lewis acid material which reacts with the chromogen released from the ruptured microcapsules to produce visible colored images.

Heretofore, microcapsules have been produced by a variety of physical and chemical methods. For example, one method involves the phenomenon of "complex coacervation", wherein two oppositely charged colloids, such as gelatin and gum arabic, are utilized under carefully controlled conditions of pH, temperature, and concentration to form a liquid wall around dispersed oil droplets containing a chromogen, which liquid wall is subsequently hardened by further chemical action. A unique feature of coacervate capsular systems is that the final microcapsules are produced in a "cluster" or "grape-like" configuration.

Several other, non-coacervate microencapsulation systems have been described in U.S. Pat. Nos. 3,779,941, 3,875,074, and 3,886,084. Most of these systems involve the formation of microcapsules by interfacial cross-linking methods, whereby a cross-linking agent is incorporated and allowed to react with a polymeric material having cross-linkable sites to form the capsule wall. While these non-coacervate systems produce microcapsules which are discrete and non-agglomerated, they do possess an inherent weakness in that the walls of the capsules are thin and exhibit a high degree of porosity. Therefore, if the "core" or encapsulated material is highly volatile or easily sublimable, it can not be retained within the capsule wall for prolonged periods of time.

SUMMARY OF THE INVENTION

The present invention remedies these drawbacks and provides microcapsules with greatly improved overall structural integrity which are discrete and non-agglomerated, but have thick walls with low degree of porosity. Optionally, the present invention can produce microcapsules with "cluster" or "grape-like" configuration without employing the phenomenon of coacervation and its associated stringent controls of the process variables.

Briefly, the present invention comprises a process for the formation of microcapsules having at least two polymeric substances forming the final microcapsule walls comprising forming a stable emulsion droplet comprising an amphiphilic polymeric agent and the material to be encapsulated and coupling to said amphipilic polymeric agent at least one polymeric substance to form a substantially impermeable wall about said material, said at least one polymeric substance being capable alone of reacting with said amphiphilic polymeric agent or capable of coupling with said amphiphilic polymeric agent in the presence of a coupling agent capable of reacting with said amphiphilic polymeric agent and said at least one polymeric substance.

The invention also comprises the resultant microcapsules and transfer sheet materials utilizing said microcapsules as described herein.

DETAILED DESCRIPTION

The present invention involves a multiple encapsulation approach. The material to be encapsulated is first emulsified using an amphiphilic polymeric substance, or first wall material, to form a primary microcapsule-like particle. This primary particle is subsequently treated in one of several ways, as described below, with at least one additional polymeric substance, a supplemental wall material, to form the final microcapsule.

The primary particle of this invention can be an ordinary emulsion droplet. It is well-known that the stability of emulsions can vary and can be significantly affected by changes in emulsion conditions such as temperature, shearing forces, and concentrations of the internal and/or external phases. For the purposes of this invention it is essential that the primary particle possesses some degree of stability, and that the equilibrium of the emulsion will not be greatly disturbed by the subsequent steps of this invention. There are several emulsion systems which have a wide range of stability limits; i.e., the stability of the emulsion will not change with reasonable changes in temperature, pressure, and concentration of the various components. The stability of the primary particle, however, can be ensured by inducing even a minimal integrity to it such as through a chemical or physical reaction of the particle either during or after its formation. Any of the known reactions such as condensation, cross-linking, complexing, and the like, can be employed in the stabilization of this primary particle.

The treatment of the primary particle to form the final capsule involves a reaction between the two wall materials, first and supplemental wall materials. This reaction may be accomplished by the addition of coupling agents, cross-linking agents, complexing agents, and the like; i.e., chemical substances capable of reacting with both wall materials, or by the proper selection of two wall materials capable of reacting with each other without need for a coupling agent.

The addition of the coupling agent may be accomplished in various ways. If only two wall materials are used and both are water-soluble, but are incompatible (i.e., incapable of forming a true, or heterogeneous solution), the mere admixing of the aqueous solutions of the two substances may result in a "layering" effect (the formation of an oil-like and a water-like layer). This layering effect can be utilized to introduce a lypophilic or an amphiphilic coupling agent which will result in the chemical bonding of the two wall materials. If, on the other hand, the wall materials are compatible, the coupling agent may be introduced with the aid of small amounts of a lypophilic solvent to permit the coupling reaction between the wall materials to occur without disruption of the emulsion equilibrium and the stability of the primary particle.

According to this invention it is possible to produce microcapsules with more than two wall materials; the particle produced as described above may be treated further with another polymeric wall material to form a "tertiary" particle. Even further polymeric materials can be added, if desired. The mode of introduction of the subsequent wall materials is determined by the compatibility characteristics of the various wall substances involved and can be effected by utilizing one or more of the steps as described for reaction between the first and supplemental wall materials.

The key variables which can influence the stability as well as the configuration of the final microcapsule of this invention are temperature, concentration of the various wall materials, concentration of the coupling agent (if used), concentration of the lypophilic solvent used (if one is required) to introduce the coupling agent, degree of shearing, and time of reaction. All of these can be readily ascertained for any given wall materials by making test runs using the temperature, concentrations, degree of shearing, and reaction times set forth in the Examples and noting the optimum conditions required for such given materials. By way of example, if the primary particle is an ordinary emulsion droplet, the temperature of the emulsion during the subsequent treatment to form the final microcapsule should be kept relatively low to avoid breaking of the emulsion and/or rearrangement of the particle size and particle size distribution. Furthermore, in such a case, the concentration of the lypophilic agent used to introduce the coupling agent (if one is needed) should also be kept reasonably low to avoid any major disruption of the emulsion equilibrium which in turn could result in a rearrangement of the primary particle. If, on the other hand, a chemical reaction has been used to stabilize the primary particle, control of the aforementioned variables of temperature and concentrations becomes less critical. The coupling agent may be added over a wide range of temperatures and concentrations of the lypophilic solvent.

Suitable substances that can be used as wall materials in this invention include natural and synthetic polymers such as polyvinyl alcohols, gelatins, gum arabic, urea-formaldehyde resins, polyamides, polyimides, natural gums, natural or modified starches, and the like; but it is preferred to utilize at least one proteinaceous polymer, such as gelatin, as one of the polymeric wall materials.

Suitable substances that can be used either as lypophilic core materials or as carriers for the coupling agent include, benzene, toluene, xylene, alkylated naphthalenes, alkylated biphenyls, alkylated phthalates, and the like.

Suitable coupling agents include oil-soluble urea and melamine-formaldehyde resins, polyisocyanates, oil-soluble polyfunctional amines, polyfunctional phenols, and the like.

In one of the utilities of this invention, the manufacture of transfer sheet record material, the process may be used to encapsulate oily substances containing chromogenic dyes. In such a use it has been found expedient to encapsulate a colorless, water-insoluble dye intermediate dissolved in an oil. Colorless dye intermediates are wholly conventional in such utilities and are well-known in the art. Exemplary of the colorless dye intermediates which have been contemplated for use in this invention are leuco dyes, such as crystal violet lactone (CVL), derivatives of bis-(p-dialkylaminoaryl)-methane such as disclosed in U.S. Pat. Nos. 2,981,733 and 2,981,783 and fluoran and bisfluoran derivatives such as disclosed in U.S. Pat. Nos. 3,819,396 and 3,821,010. These dye intermediates are colorless in an alkaline or neutral medium and react to form a visible color in an acidic medium. Thus, when a capsule containing such a compound is ruptured and the compound is discharged onto an absorbent, acidic, electron-accepting material such as a paper web coated with an organic or an inorganic acid material, a visible color appears on the absorbent material at the point of contact.

Transfer sheet record materials containing microcapsules made accordingly to the process of this invention are significantly superior to existing commercial products. For example, copy systems of the present invention are more resistant to conditions of high humidities and temperatures such as those encountered in warehouse storage of the product. Furthermore, due to the improved structural integrity of the present microcapsules, these products offer greater resistance to smudging; premature color formation, during shipping and handling of the product.

In another utility of this invention, the process may be used to encapsulate either both or only one of the two main components (leuco dye, or acidic reactant) of a carbonless system and prepare a "self-contained" carbonless copy system by admixing both co-reactants and coating them onto the same surface of the substrate. The term "self-contained" is used to describe a carbonless system where both the dye-containing capsules and the acidic substance are coated on the same surface and whereby the application of localized pressure to said surface can produce colored images by merely rupturing the microcapsules and allowing the two reactive components to come into intimate contact. Heretofore, self-contained systems have been made by multiple, sequential coatings of the dye-containing microcapsules, a barrier or film-forming substance, and the acidic co-reactant, all on the same surface. The superior structural integrity of the microcapsules of the present invention allows for the manufacture of a one-pass self-contained carbonless system. This can be accomplished by encapsulating the leuco dye, the acidic material, or both, pre-mixing the two components without obtaining a premature color formation, and applying them onto the substrate in one coating pass. This approach results in substantial cost savings in the manufacture of these systems and in an aesthetically superior product.

In still another utility of this invention, the process may be used to encapsulate antimicrobial and fungistatic materials such as 2-n-octyl-4-isothiazolin-3-one, and N-(trichloromethylthio)-4-cyclohexene 1, 2 dicarboximide. Antimicrobial materials are frequently incorporated in plastic substrates, such as films of polyvinyl chloride and the like, to prevent or retard bacterial growth and activity. This bacterial growth can often result in the deterioration of the aesthetic as well as the physical properties of the plastic substrates. The microencapsulation of these antimicrobial materials prior to incorporating them in the plastic matrix increases their effectiveness by greatly reducing their migration, improves their handling during processing and eliminates some undesirable side effects such as reduced heat resistance of the plastic caused by the presence of the antimicrobial substance.

In still another utility of this invention the process may be used to encapsulate one or more components in multi-component epoxy resin systems. In many industrial applications, it is common practice to pre-impregnate various substrates such as fiberglass, graphite fibers, and the like with the epoxy components (reactants and catalysts) prior to molding the substrate into its final shape at the curing temperature of the epoxy resin system. Oftentimes, there is a substantial time lapse ranging from a few days to several weeks, between the pre-impregnation of the substrate and its final fabrication. During this period, the pre-impregnated substrate has to be stored at low temperatures (0° C. or below) to minimize the premature reaction between the various components of the epoxy system. Such a procedure is not only awkward and costly, but it is frequently ineffective. If a premature reaction occurs, there are no sufficient reactive sites left to be used in the final stages of the fabrication process and the materials are rendered useless. Encapsulating one or more of the epoxy system reactive components prior to preparing the final epoxy mixture, allows the pre-impregnated substrates to be stored at ambient temperatures even for prolonged periods of time and prevents loss of materials due to premature reaction.

These and other utilities and advantages of this invention will be further described in connection with the Examples that follow which are set forth for purposes of illustration only.

EXAMPLE 1

Ninety-five grams of a solution containing 93 gms of di-isopropyl naphthalene and 2 gms of crystal violet lactone (CVL) are emulsified with 100 gms of a 6% by weight aqueous solution of an 88% hydrolyzed polyvinyl alcohol (Airco's Vinol-540). Emulsification is continued until an average particle size of 5 microns is obtained. Ten grams of a 60% by weight aqueous solution of melamine-formaldehyde resin (Virginia Chemicals Virset-656-4) are added and the emulsion is heated at 50° C. for two hours with agitation. To the heated emulsion, 6 gms of xylene, 4 gms of a hexamethylene di-isocyanate adduct (Mobay's Desmodur-L-2291A), and 50 gms of a 10% by weight aqueous solution of 99% hydrolyzed polyvinyl alcohol (Airco's Vinol-137) are added with agitation and the temperature of the emulsion is raised to 60° C. and maintained for an additional two hours. The capsule-containing dispersion is cooled to room temperature and mixed with 35 gms of a load-bearing material such as Henkel's Keestar-328, a granular, uncooked starch. The resultant dispersion is coated onto a paper substrate at a coat weight of 5 gms/m$^2$ and dried. When this capsule containing coated sheet is imaged on an acidic receptor sheet (CF), brilliant blue images are produced. Furthermore, when the capsule-coated sheet is heated in an oven at 100° C. for three hours and reimaged against the same CF sheet, images of equal intensities are produced.

EXAMPLE 2

Example 1 is repeated with the exception that the 6 gms of xylene and the 4 gms of Desmodur L-2291A are omitted. Equivalent results are obtained.

EXAMPLE 3

To one hundred gms of a 2% by weight CVL solution in monoisopropylbiphenol, 4 gms of a toluene di-isocyanate adduct (Mobay's Mondur) are added and the solution is emulsified with 100 gms of a 13% by weight aqueous solution of gelatin (Hudson Industries G-110). The emulsion is agitated until an average particle size of 5 microns is obtained, and heated at 60° C. for two hours. Subsequently, 10 gms of a 10% by weight polyvinyl alcohol (Airco's Vinol-205), 1 gm of tolene, and 1 gm of Desmodur L-2291A are added with agitation and the heating is continued at 60° C. for an additional two hours. The microcapsular dispersion is cooled to room temperature and treated in a manner similar to that described in Example 1. Equivalent results are obtained.

EXAMPLE 4

An oil solution comprising 95 gms of monoisopropyl-biphenol, 3 gms of an oil-soluble melamine-formaldehyde resin and 2 gms of CVL are emulsified with 100 gms of a 15% by weight aqueous solution of gelatin (Hudson Industries' G-135) until the average particle size of the emulsion is 5 microns. The emulsion is heated at 50° C. for two hours with agitation. Subsequently, 5 gms of Desmodur L-2291A dissolved in 5 gms of benzene are added and followed by the addition of 30 gms of a 10% by weight aqueous solution of Vinol-205. The temperature of the emulsion is raised to 60° C. and maintained for two hours. The microcapsular dispersion is cooled to room temperature and treated in a manner similar to that described in Example 1 (mixed with a load-bearing material, coated onto paper and dried). Equivalent results are obtained.

EXAMPLE 5

A solution is prepared by admixing 0.1 moles of 2-hydroxy-4-methyl-5-isobutylthio-benzoic acid, 0.1 mole of a 10% by weight aqueous LiOH solution, 80 gms of hydrated alumina (Reynold's Paperad), 100 gms of a 20% by weight aqueous solution of ethylated starch (Penik & Fords Pencote), and 20 gms of Keester-328. To this solution 20 gms of the aqueous microcapsular dispersion prepared from Example 4 is added, thoroughly mixed, coated onto paper at a coat weight of 6 gms/m$^2$, and dried. When pressure is applied to the coated surface, the microcapsules are ruptured, releasing the CVL-containing oily material and forming an in-situ image of high intensity.

EXAMPLE 6

A solution containing 0.1 moles of 2-hydroxy-4-methyl-5-isobuylthio-benzoic acid, 50 gms of xylene, and 0.1 mole zinc octoate is emulsified with 100 gms of 6% by weight aqueous solution of Vinol-540 until the average particle size is 8 microns. Twenty gms of a 60% by weight aqueous solution of a melamine-formaldehyde resin are added and the emulsion is heated at 50° C. for 4 hours. Subsequently, twenty gms of 20% by weight aqueous solution of Vinol-205 are added and the microcapsular dispersion is heated at 60° C. for two hours. Fifty gms of the above dispersion were mixed with 10 gms of the microcapsular dispersion from Example 4, coated onto a paper substrate at a coat-weight of 5.5 gms/m$^2$ and dried. When pressure was applied to the coated surface, brilliant, stable, colored images were produced.

EXAMPLE 7

Five gms of Desmodur L-2291A are dissolved in 60 gms of epoxidized soy bean oil. In this solution, 20 gms of the antimicrobial N-(trichloromethylthio)-4-cyclohexene 1,2 dicarboximide are dispersed, and the dispersion is emulsified with 150 gms of a 12% by weight aqueous solution of gelatin G-110, until an average particle size of 2 microns is obtained. The dispersion is heated to 60° C. for two hours and 3 gms of Desmodur L-2291A dissolved in 3 gms of xylene, and 50 gms of a 10% by weight aqueous solution of gelatin G-135 are added stepwise. Heating at 60° C. is continued for an additional two hours and the microcapsular dispersion is cooled to room temperature and dried.

EXAMPLE 8

Seventy gms of benzyldimethyl aniline (BDMA) are emulsified with 200 gms of a 10% by weight aqueous solution of Vinol-205 until an average particle size of 2 microns is obtained. Thirty-five gms of Virset 656-4 (60% by weight aqueous solution of melamine-formaldehyde resin) are slowly added with agitation, and the emulsion is heated at 50° C. for 4 hours. Subsequently, 3 gms of Desmodur L-2291A dissolved in 3 gms of toluene, and 50 gms of a 6% by weight aqueous solution of Vinol-540 are added stepwise. The emulsion is continued to be heated at 50° C. for an additional two hours, cooled to room temperature and dried. When the dry, microencapsulated BDMA is added to a two-component epoxy formulation in catalytic amounts, approximately 5% by weight of active BMDA based on the total weight of the epoxy formulation, the final formulation exhibits substantially extended shelf-lives, i.e., the epoxy formulation, or a substrate such as yarns of fiberglass or graphite fibers, ect., coated, or impregnated with the epoxy formulation with the encapsulated BDMA in it can be stored at ambient or reasonably higher temperatures for prolonged periods of time without premature reaction of the epoxy formulation. Comparatively, similar epoxy formulations containing unencapsulated BDMA can be stored only at temperatures of 0° C. or lower, and only for brief periods of time. Still, the encapsulated BDMA retains its ability to perform its catalytic function when the temperature of the epoxy formulation is raised to the desired curing point of the epoxy.

Though gelatins of any gel strength can be used, it is preferred to use gelatins having the gel strengths of Hudson's G-110, 130, 165 or mixtures thereof. As to the polyvinyl alcohol it is preferred to use polyvinyl alcohol hydrolyzed to the extent of at least 88%.

EXAMPLE 9

To 95 gms of 2% by weight CVL solution in monoisopropylbiphenol, 5 gms of Desmodur L-2291A are added and the solution is emulsified with 120 gms of a 10% by weight aqueous solution of gelatin G-110. The emulsion is agitated until an average particle size of 5 microns is obtained, and heated to 40° C. for one half hour. Subsequently, 1 gm of Desmodur L-2291A dissolved in 6 gms of xylene is added to the emulsion under agitation, and followed by the addition of 20 gms of a 10% by weight aqueous solution of gelatin G-110. The temperature of the emulsion is raise to 60° C. and heating is continued for two hours. The microcapsular dispersion is cooled to room temperature and mixed with 30 gms of Keestar 328, 50 gms of a 15% by weight aqueous solution of Pencote starch, and 3 gms of Virset 656-4. The resultant dispersion is coated onto a paper substrate at a coat weight of 4 gms/m$^2$ and dried. This capsule containing coated sheet possesses all the properties of the coated sheet described in Example 1.

Equally suitable results are obtained with cross-linking agents such as polyfunctional aliphatic isocyanate, toluene diisocyanate adduct, melamine-formaldehyde resin, and urea-formaldehyde resin.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for the formation of microcapsules having at least two polymeric substances, at least one of which is a proteinaceous polymer, and forming multiple microcapsule walls in the absence of coacervation comprising forming stable emulsion droplets comprising an amphiphilic polymeric agent and the material to be encapsulated and coupling to said amphiphilic polymeric agent by means of a coupling agent at least one polymeric substance to form substantially impermeable multiple walls about said material, said coupling agent capable of reacting with said amphiphilic polymeric agent and said at least one polymeric substance being oil-soluble urea-formaldehyde resins, oil-soluble melamine-formaldehyde resins, polyisocyanates, oil-soluble polyfunctional amines, or polyfunctional phenols.

2. The process of claim 1 wherein at least one of said amphiphilic polymeric agent and said at least one polymeric substance is a proteinaceous polymer and the other one is a hydrolyzed polyvinyl alcohol.

3. The process of claims 2 wherein said proteinaceous polymer is gelatin and said polyvinyl alcohol is hydrolyzed to the extent of at least 88%.

4. The process of claim 1 wherein both said amphiphilic polymeric agent and said at least one polymeric substance are proteinaceous polymers.

5. The process of claim 1 wherein said coupling agent is a polyisocyanate.

6. The process of claim 1 wherein said coupling agent is an oil-soluble urea-formaldehyde resin.

7. The process of claim 1 wherein said coupling agent is an oil-soluble melamine formaldehyde resin.

8. The process of claim 1 wherein said coupling agent is an oil-soluble polyfunctional amine.

9. The process of claim 1 wherein said coupling agent is a polyfunctional phenol.

10. Multi-walled microcapsules comprising encapsulated material surrounded by substantially impermeable walls, one consisting essentially of an amphiphilic polymeric agent coupled by means of a coupling agent to at least one polymeric substance to form substantially impermeable multiple walls about said material, said coupling agent capable of reacting with said amphiphilic polymeric agent and said at least one polymeric substance and being selected from oil-soluble urea-formaldehyde resins, oil-soluble melamine-formaldehyde resins, polyisocyantes, oil-soluble polyfunctional amines, or polyfunctional phenols, at least one said polymeric agent and polymeric substance being a proteinaceous polymer.

11. The microcapsules of claim 10 wherein at least one said amphiphilic polymeric agent and said polymeric substance is a proteinaceous polymer and the other one is a hydrolyzed polyvinyl alcohol.

12. The microcapsules of claim 11 wherein the proteinaceous polymer is gelatin and the hydrolyzed polyvinyl alcohol is hydrolyzed to the extent of at least 88%.

13. A product comprising a substrate having on at least one portion of a surface thereof a layer comprising the microcapsules of claim 10.

14. The product of claim 13 wherein the substrate is a cellulosic material.

15. The product of claim 13 wherein said coupling agent is a polyisocyanate.

16. The product of claim 13 wherein said coupling agent is an oil-soluble urea-formaldehyde resin.

17. The product of claim 13 wherein said coupling agent is an oil-soluble melamine formaldehyde resin.

18. The product of claim 13 wherein said coupling agent is an oil-soluble polyfunctional amine.

19. The product of claim 13 wherein said coupling agent is a polyfunctional phenol.

20. The microcapsules of claim 10 wherein said coupling agent is a polyisocyanate.

21. The microcapsules of claim 10 wherein said coupling agent is and oil-soluble urea-formaldehyde resin.

22. The microcapsules of claim 10 wherein said coupling agent is an oil-soluble melamine formaldehyde resin.

23. The microcapsules of claim 10 wherein said coupling agent is an oil-soluble polyfunctional amine.

24. The microcapsules of claim 10 wherein said coupling agent is a polyfunctional phenol.

25. A transfer sheet record material comprising a cellulosic substrate coated on at least a portion of one surface thereon with multi-walled microcapsules comprising encapsulated material surrounded by substantially impermeable walls, one consisting essentially of an amphiphilic polymeric agent coupled by means of a coupling agent to at least one polymeric substance to form substantially impermeable multiple walls about said material, said coupling agent capable of reacting with said amphiphilic polymeric agent and said at least one polymeric substance and being oil-soluble urea-formaldehyde resins, oil-soluble melamine-formaldehyde resins, polyisocyanates, oil-soluble polyfunctional amines, or polyfunctional phenols at least one of said polymeric agent and polymeric substance being a proteinaceous polymer and said encapsulated material being a chromogenic dye or an acidic reactant capable of reacting with said dye to develop a color.

26. The transfer sheet material of claim 25 wherein the encapsulated material is a chromogenic dye and at least one of said amphiphilic polymeric agent and polymeric substance is a proteinaceous polymer and the other one is a hydrolyzed polyvinyl alcohol.

27. The transfer sheet material of claim 26 wherein said coating contains, in addition to the microcapsules, an acidic reactant capable of reacting with said dye to develop a color.

28. The transfer sheet material of claims 26 or 27 wherein the proteinaceous polymer is gelatin.

29. The method of making the transfer sheet material of claim 27 comprising separately encapsulating a chromogenic dye component and an acidic material component capable of reacting with the chromogenic dye to develop a color in microcapsules having at least two polymeric substances forming multiple microcapsule walls comprising forming stable emulsion droplets comprising gelatin and the material to be encapsulated and coupling to said gelatin wall at least one polymeric substance to form substantially impermeable multiple walls about said material, said at least one polymeric substance being capable alone of reacting with said gelatin of coupling with said gelatin in the presence of a coupling agent capable of reacting with said gelatin and said at least one polymeric substance admixing the two encapsulated components under conditions sufficient to form a substantially uniform mixture thereof but insufficient to rupture said capsules, and applying the mixture onto the substrate in a singe coating pass.

30. The transfer sheet record material of claim 25 wherein said coupling agent is a polyisocyanate.

31. The transfer sheet record material of claim 25 wherein said coupling agent is an oil-soluble urea-formaldehyde resin.

32. The transfer sheet record material of claim 25 wherein said coupling agent is an oil-soluble melamine formaldehyde resin.

33. The transfer sheet record material of claim 25 wherein said coupling agent is an oil-soluble polyfunctional amine.

34. The transfer sheet record material of claim 25 wherein said coupling agent is a polyfunctional phenol.

* * * * *

UNITED STATES PATENT AND TRADEMARK OFFICE
CERTIFICATE OF CORRECTION

PATENT NO. : 4,586,060
DATED : April 29, 1986
INVENTOR(S) : Vassiliades

It is certified that error appears in the above—identified patent and that said Letters Patent are hereby corrected as shown below:

Column 10, line 30, the word "singe" should read --single--

Signed and Sealed this

Twenty-sixth Day of August 1986

[SEAL]

Attest:

Attesting Officer

DONALD J. QUIGG

Commissioner of Patents and Trademarks